United States Patent [19]

Schweitzer, Jr.

[11] 3,866,197

[45] Feb. 11, 1975

[54] MEANS FOR DETECTING FAULT CURRENT IN A CONDUCTOR AND INDICATING SAME AT A REMOTE POINT

[75] Inventor: Edmund O. Schweitzer, Jr., Northbrook, Ill.

[73] Assignee: E. O. Schweitzer Manufacturing Co., Inc., Mundelein, Ill.

[22] Filed: Dec. 10, 1973

[21] Appl. No.: 423,283

[52] U.S. Cl. .............................. 340/253 A, 324/133
[51] Int. Cl. ............................................. G08b 21/00
[58] Field of Search ........... 340/248, 253, 255, 214; 324/51, 133; 317/22, 33 SD, 58; 335/205, 206, 207

[56] References Cited
UNITED STATES PATENTS

| | | | |
|---|---|---|---|
| 3,229,274 | 1/1966 | Riley et al. ................... | 340/248 C X |
| 3,401,366 | 9/1968 | Paholek et al. ..................... | 335/206 |
| 3,413,548 | 11/1968 | Schweitzer, Jr. ..................... | 324/133 |
| 3,538,386 | 11/1970 | Schweitzer, Jr. ....................... | 317/58 |
| 3,676,740 | 7/1972 | Schweitzer, Jr. ....................... | 317/22 |
| 3,702,966 | 11/1972 | Schweitzer, Jr. ..................... | 324/133 |
| 3,708,724 | 1/1973 | Schweitzer, Jr. ....................... | 317/22 |
| 3,715,742 | 2/1973 | Schweitzer, Jr. ................ | 340/253 A |
| 3,816,816 | 6/1974 | Schweitzer, Jr. ..................... | 324/133 |

Primary Examiner—John W. Caldwell
Assistant Examiner—Daniel Myer
Attorney, Agent, or Firm—Robert R. Lockwood

[57] ABSTRACT

The rectified output of one or more current transformers associated respectively with one or more conductors of a high voltage alternating current system is applied to a fault responsive winding on a magnetic circuit of a fault responsive device for magnetizing it with unidirectional magnetic flux in one direction. A normally open reed switch in the magnetic field of the magnetic circuit is closed on flow of fault current in one or more of the conductors and is connected to control signalling or control means located at a point remote from the fault responsive device. For demagnetizing the magnetic circuit, a reset winding is positioned on the magnetic circuit and is connected for energization to a direct current source under the control of a manually operable switch at the remote point.

13 Claims, 4 Drawing Figures

MEANS FOR DETECTING FAULT CURRENT IN A CONDUCTOR AND INDICATING SAME AT A REMOTE POINT

This invention relates, generally, to systems responsive to flow of fault current in a high voltage conductor and has particular relation to systems indicating at a remote point the flow of fault current and at the remote point resetting the fault responsive means. It constitutes an improvement over the system disclosed in my U.S. Pat. No. 3,715,742 and the patents and patent applications referred to therein.

Among the objects of this invention are: To detect the flow of fault current in a high voltage conductor and indicate the same at a remote point; to reset the fault current detecting means from the remote point; to close the normally open contacts of a reed switch on flow of fault current and employ the closure thereof at a remote point to operate signalling or control means; to magnetize a magnetic circuit with unidirectional magnetic flux in response to flow of fault current for closing the reed switch and for demagnetizing the magnetic circuit from a remote point to open the reed switch; at the remote point to provide for testing the condition of the reed switch and for resetting it; and to employ indicating means, such as light emitting diodes, for showing the condition of the reed switch.

In the drawings:

FIG. 4 illustrates diagrammatically a system similar to that illustrated in FIG. 3 in which there is provided a definite time delay in opening the reed switch to permit complete reversal of the magnetic flux in the magnetic circuit of the fault responsive device.

Figure 1:
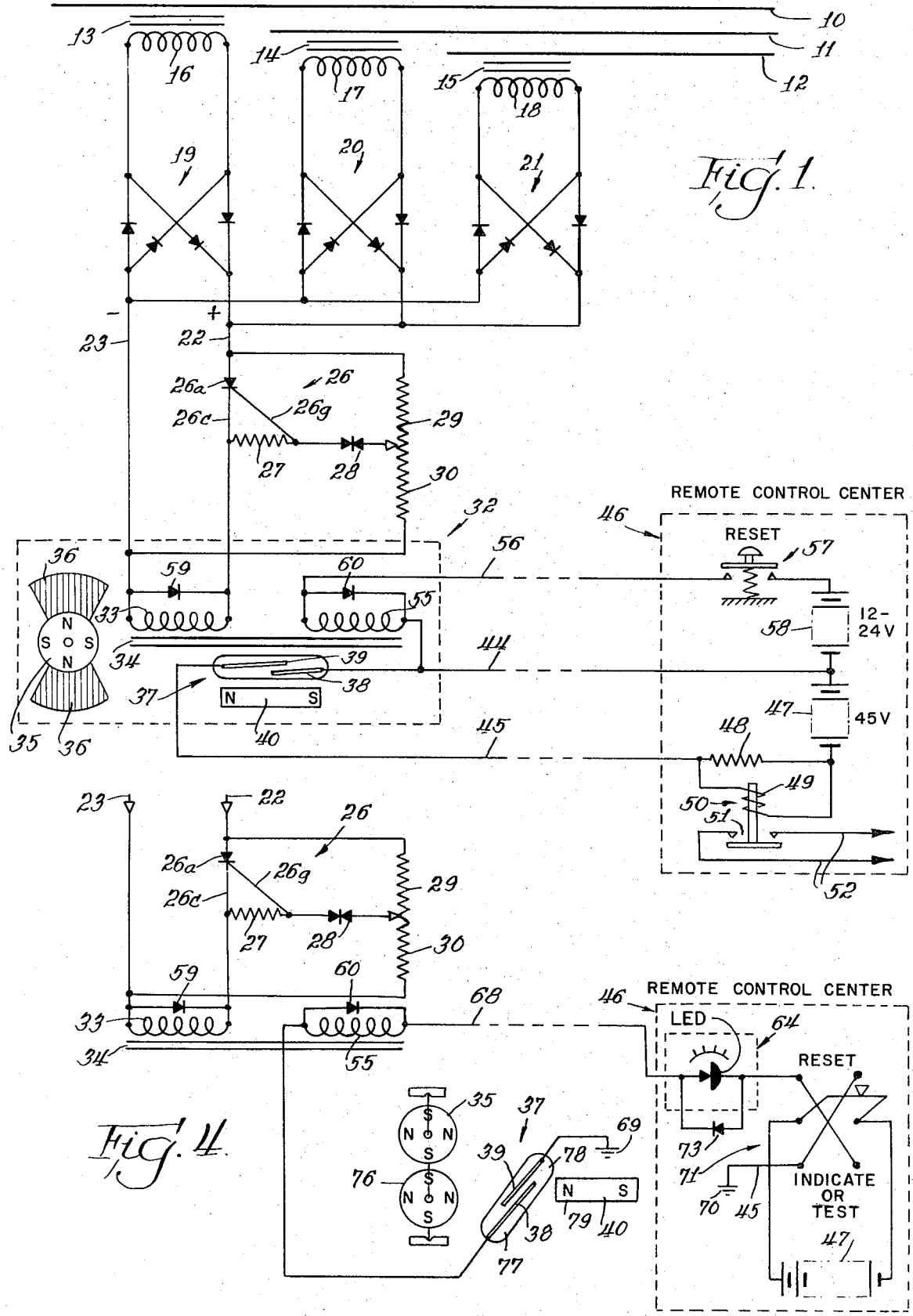
FIG. 1 illustrates diagrammatically one embodiment of this invention in which the fault responsive device is located in close proximity to a poly phase high voltage alternating current power system and is arranged to indicate at a remote point that a fault has occurred and at the remote point the fault responsive device can be reset after it once has operated in response to a fault.

Referring now particularly to FIG. 1 the reference characters 10, 11 and 12 designate high voltage conductors of an alternating current power system which may be located overhead or underground and which may operate at voltages of the order of 2,300 volts and above. Magnetic cores 13, 14 and 15 are associated, respectively, with the conductors 10, 11 and 12 and are provided with the secondary windings 16, 17 and 18. It will be understood that alternating current flows in the windings 16, 17 and 18 in accordance with the magnitude of the current flow in the respective conductors 10, 11 and 12. The outputs of the secondary windings 16, 17 and 18 are rectified by rectifiers that are indicated, generally, at 19, 20 and 21. The rectified outputs are commonly applied across conductors 22 and 23 which have the indicated polarities.

Connected in conductor 22 is an SCR or voltage responsive switch that is indicated, generally, at 26. It has an anode 26a, a cathode 26c and a gate 26g. A leakage resistor 27 is connected between the cathode 26c and the gate 26g and through a trigger diode 28 to calibrating resistors 29 and 30 which are connected in series circuit relation and across the conductors 22 and 23.

Normally no current flows in the conductors 22 and 23 since the SCR 26 is normally non conductive. However, on the flow of predetermined fault current in any one of the conductors 10, 11 and 12, the voltage between conductors 22 and 23 is increased to such an extent that the SCR breaks down and becomes conductive. Direct current then flows in the conductors 22 and 23 in accordance with the magnitude of the fault current flowing in the respective conductor 10, 11 and 12.

Figure 2:
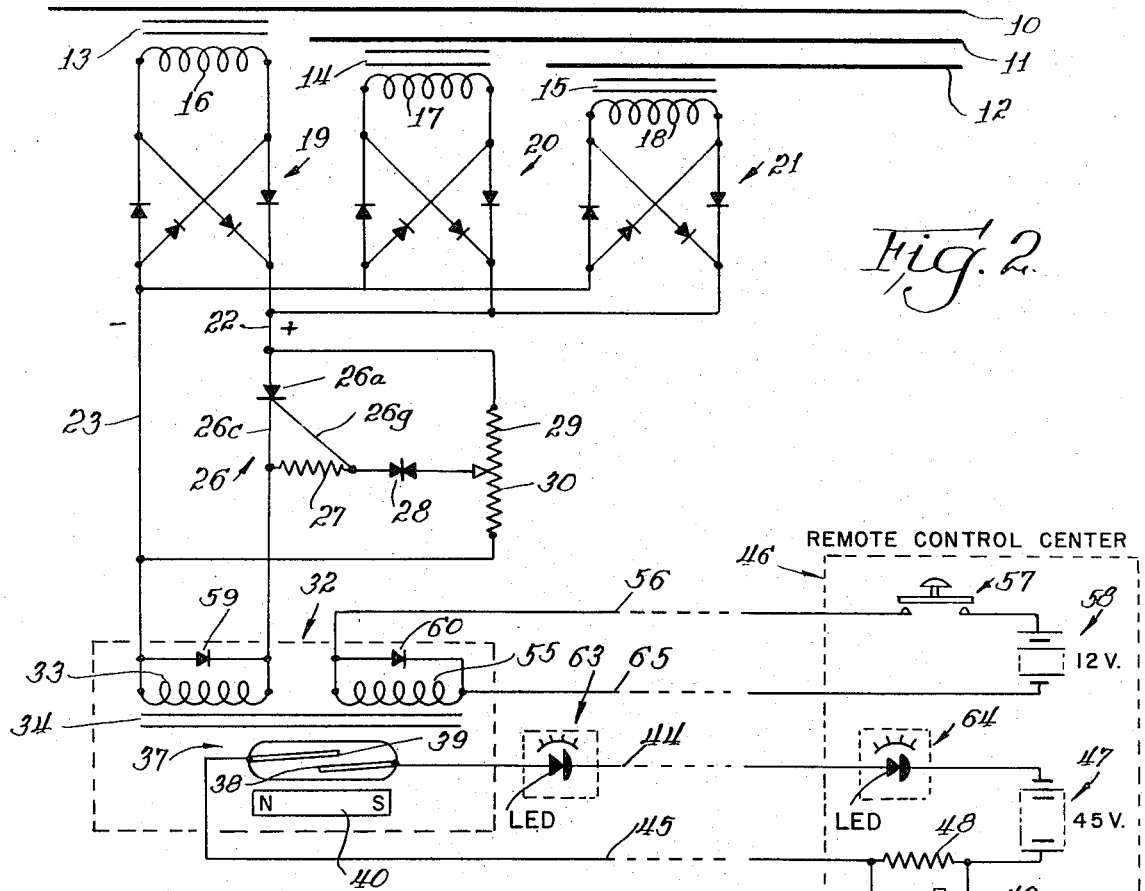
FIG. 2 is a circuit similar to that illustrated in FIG. 1 in which light emitting diodes are employed for indicating in the field and at the office that a fault has occurred.
Figure 3:
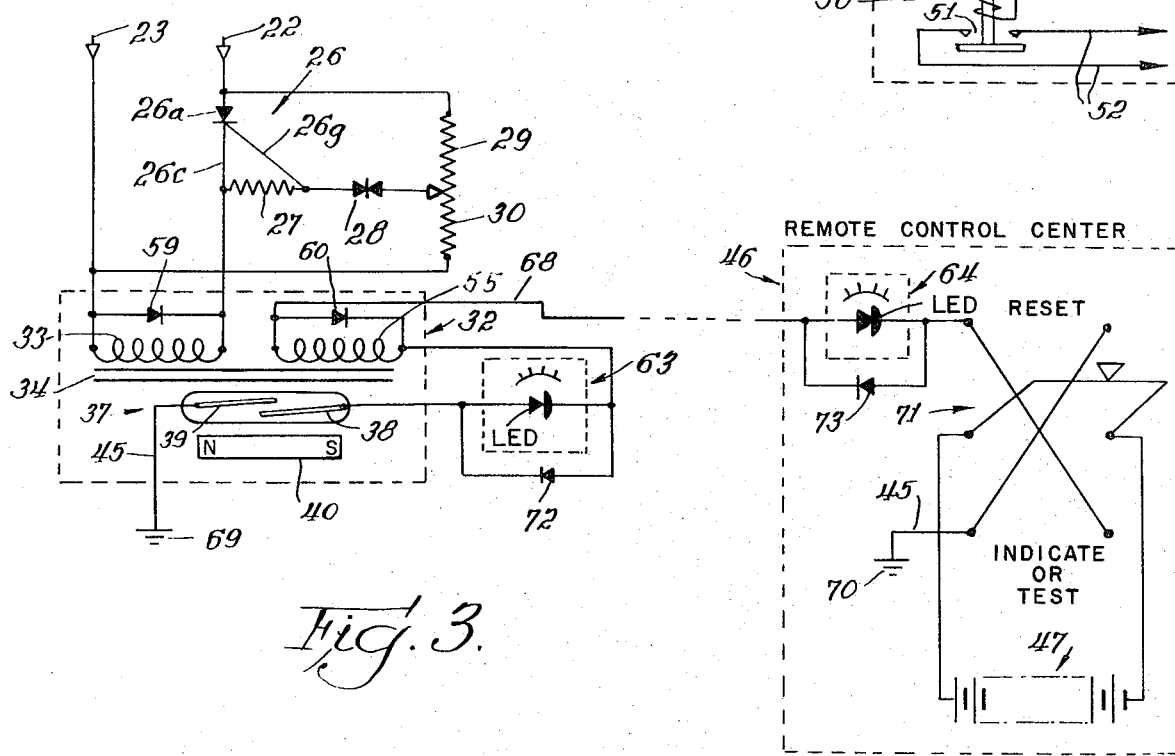
FIG. 3 illustrates diagrammatically a system similar to those shown in FIGS. 1 and 2 but in which the light emitting diodes are connected in series circuit relation through a reset winding on the fault responsive device and in which only a single conductor is required between the fault responsive device and the remotely located control center.

A fault responsive relay, indicated generally at 32, is employed to detect the flow of direct current in the conductors 22 and 23. The fault responsive device 32 can be constructed as illustrated in FIGS. 2 and 3 of the above identified patent. Accordingly, it is illustrated herein only diagrammatically. Instead of the center tapped winding illustrated in the above patent, two windings are employed in the fault responsive device 32 one of which comprises a fault responsive winding 33 which is located on the magnetic circuit 34 of the fault responsive device 32. As described in the above patent there is provided in the fault responsive device a permanent magnet 35 which is pivotally mounted and is arranged to be pivoted from one position to an alternate position on magnetization or demagnetization of the magnetic circuit 34. For indicating the position of the permanent magnet 35 it is provided with radially extending targets 36. On energization of the fault responsive winding 33 the permanent magnet 35 is pivoted through 90° to an alternate position. On demagnetization of the magnet circuit 34 the permanent magnet 35 is pivoted through 90° to its original position.

Also associated with the magnetic circuit 34 and forming a part of the fault responsive device 32 is a reed switch that is indicated, generally, at 37 and is provided with reeds 38 and 39 which normally occupy the open circuit position illustrated in FIG. 1. On magnetization of the magnetic circuit 34 the unidirectional magnetic flux causes the reeds 38 and 39 to come into contact engagement or to close a circuit therethrough. A biasing permanent magnet 40 is located adjacent the reed switch 37 in order to hold the reeds 38 and 39 in the closed position.

It will be understood that the fault responsive device 32 and associated equipment previously described may be located at a substation and that it is desirable to provide an indication of the occurrence of a fault or closure of the reed switch 37 at a remote point. For this purpose conductors 44 and 45 are employed and they are connected, respectively, to the reeds 38 and 39 of the reed switch 37. The broken portions of the conductors 44 and 45 represent a distance which may be several miles to a remote control center that is indicated, generally, at 46. It will be understood that the remote control center 46 may be located in an office which contains other supervisory equipment and that a number of fault responsive devices can be associated therewith.

It will be noted that the conductors 44 and 45 are connected at the remote control center 46 across a source of direct current which may be a battery as indicated, generally at 47. The conductors 44 and 45 are connected through a series resistor 48 to complete a circuit from the battery 47 through the reeds 38 and 39 of the reed switch 37. A winding 49 of a relay, shown generally at 50, is connected across the series resistor 48 and is arranged to close contacts 51 on closure of the reed switch 37. Associated with the contacts 51 is a control or signalling circuit that is indicated at 52 which may be used for these purposes.

Once the fault responsive device 32 has operated and the fault current has ceased to flow, the fault responsive device 32 is reset to the normal position. For this purpose a reset winding 55 is located on the magnetic circuit 34 and is connected by a conductor 56 to the remote control center 46 and through a reset push button switch 57 to a source of direct current or a battery that is indicated, generally, at 58. It will be observed that the batteries 47 and 58 are commonly connected and that a return circuit for the reset winding 55 is provided over the conductor 44.

On closure of the contacts of the push button switch 57, the reset winding 55 is energized to demagnetize the magnetic circuit 34 and overcome the biasing effect of the biasing permanent magnet 40. Thereupon the reeds 38 and 39 of the reed switch 37 separate to open the circuit to the series resistor 48. The winding 49 is deenergized and contacts 51 of the relay 50 are opened. A corresponding signal or control effect is provided over the circuit 52. The permanent magnet 35 pivots to a position corresponding to the condition of the fault responsive device 32 under normal operating conditions when a fault is absent.

With a view to preventing induction of magnetic flux into the fault responsive winding 33 on energization of the reset winding 55, rectifiers 59 and 60 are connected across them. Thus there is no likelihood of the fault responsive device 32 of being operated improperly in response to energization of the reset winding 55.

The system illustrated in FIG. 2 is similar to that illustrated in FIG. 1 and described above. Here the permanent magnet 35 and the targets 36 are omitted. Instead light emitting diodes 63 and 64 are connected in series circuit relation in the conductor 44. The light emitting diode 63 is located adjacent the reed switch 37 and the fault responsive device 32 to indicate there at by being illuminated that a fault has occurred in one of the conductors 10, 11 or 12. The light emitting diodes 64 is located at the remote control center 46.

An additional conductor 65 interconnects the reset winding 55 and the battery 58. For the system shown in FIG. 2, four conductors are required between the fault responsive device 32 in the field and the control and indicating equipment at the remote control center 46.

FIG. 3 shows a system in which only a single conductor 68 is required between the fault responsive device 32 located in the field and the remote point or remote control center 46 provided that the conductor 45 is grounded at 69 in the field and at 70 at the remote point or remote control center 46. Also it will be observed that the light emitting diodes 63 and 64 are connected in series circuit relation through the reset winding 55.

At the control center or remote point 46 there is provided a double pole double throw switch 71 in conjunction with the battery 47. When the switch 71 is placed in the lower position positive polarity is applied over the conductor 45 and respective grounds to determine the condition of the reed switch 37. If it is open then neither of the light emitting diodes 63 or 64 is illuminated. This indicates that these contacts are open and that no fault has existed in the field where the fault responsive device 32 is located. If the reed switch 37 is closed, then the light emitting diodes 63 and 64 are illuminated to indicate at both locations that a fault has occurred.

For resetting the fault responsive device 32, the switch 71 is moved to the upper or reset position. Rectifiers 72 and 73 connected across the light emitting diodes 63 and 64 permit reverse flow of direct current through the conductor 68 to energize the reset winding 55 and effect opening of the reed switch 37.

In FIG. 4 the fault responsive device 32 employs the pivoted magnet 35 and pivoted therewith is a second permanent magnet 76. One end 77 of the reed switch 37 is located adjacent the permanent magnet 76 while the other end 78 is located adjacent the north end 79 of the biasing permanent magnet 40.

The normal operating condition of the system shown in FIG. 4 is as illustrated therein with a north pole of the permanent magnet 76 adjacent to the end 77 of the reed switch 37. Repulsive flux through the switch 37 to the north pole 79 of the stationary biasing permanent magnet 40 causes the reeds 38 and 39 to open and to remain open.

On the occurrence of a fault and corresponding energization of the fault responsive winding 33 the magnets 35 and 76 pivot through 90° to place a south pole of the permanent magnet 76 adjacent the end 77 of the reed switch 37. The reeds 38 and 39 are then closed and the circuit through the reset winding 55 and light emitting diode 64 is completed to indicate at the remote control center 46 that a fault has occurred.

On operation of the double pole throw switch 71 to the upper position, reset direct current flows through the conductor 68 and the reset winding 55 to demagnetize the magnetic circuit 34. The reset current flows through the closed reeds 38 and 39 of the reed switch 37 which remain closed for a sufficient time to provide a time delay and allow for the reversal of the magnetic flux in the magnetic circuit 34. The reason for this time delay is that the reeds 38 and 39 will not separate until the permanent magnet 76 is returned to the position illustrated in FIG. 4 which corresponds to the normal condition of the fault responsive device 32.

I claim:

1. Means for detecting flow of fault current in a high voltage alternating current carrying conductor and indicating the same at a remote point comprising: a fault responsive device including a magnetic circuit, a fault responsive winding on said magnetic circuit, means for energizing said fault responsive winding with direct current according to the magnitude of flow of alternating fault current in said conductor, a reset winding on said magnetic circuit, and a normally open reed switch adjacent said magnetic circuit arranged to be closed on energization of said fault responsive winding resulting from flow of fault current in said conductor; indicating means at a said remote point connected to be responsive to closure of said reed switch, and means at said remote point for connecting said reset winding to a direct current source for reversing the magnetization of said magnetic circuit and opening said reed switch.

2. Fault current flow detecting and indicating means according to claim 1 wherein said direct current source is located at said remote point, and manually operable switch means at said remote point is arranged to connect said direct current source to said reset winding.

3. Fault current flow detecting and indicating means according to claim 1 wherein said indicating means includes a relay having an operating winding that is energized when said reed switch is closed, and contacts operated by said operating winding.

4. Fault current flow detecting and indicating means according to claim 1 wherein signalling means are located adjacent said fault responsive means and at said remote point to indicate that fault current has flowed in said conductor.

5. Fault current flow detecting and indicating means according to claim 1 wherein rectifier means individual to each of said windings are connected across the same to prevent energization of said fault responsive winding on energization of said reset winding.

6. Fault current flow detecting and indicating means according to claim 4 wherein said signalling means includes a light emitting diode that is illuminated on closure of said reed switch.

7. Fault current flow detecting and indicating means according to claim 6 wherein one light emitting diode is located adjacent said fault responsive device and another light emitting diode is located at said remote point.

8. Fault current flow detecting and indicating means according to claim 6 wherein said light emitting diode is located at said remote point and is connected in series with said reset winding and said reed switch.

9. Fault current flow detecting and indicating means according to claim 8 wherein a rectifier shunts said light emitting diode and is oppositely poled to permit flow of reset current to said reset winding.

10. Fault current flow detecting and indicating means according to claim 7 wherein said light emitting diodes are connected in series with each other and with said reed switch.

11. Fault current flow detecting and indicating means according to claim 2 wherein said manually operable switch means comprises a double pole double throw switch arranged in one position to test the condition of said reed switch and in another position to energize said reset winding.

12. Fault current flow detecting and indicating means according to claim 1 wherein a pivoted permanent magnet is located adjacent said magnetic circuit and is arranged to be shifted from a normal position to an operated position on flow of predetermined fault current in said conductor, one end of said reed switch is located adjacent said pivoted permanent magnet to close said reed switch when said pivoted permanent magnet is shifted to said operated position, and a biasing permanent magnet is located adjacent the other end of said reed switch to hold said reed switch in closed position until the magnetization of said magnetic circuit is reversed on energization of said reset winding.

13. Fault current flow detecting and indicating means according to claim 12 wherein said reset winding is connected in series with said reed switch.

* * * * *